United States Patent [19]

Lee et al.

[11] Patent Number: 5,046,080
[45] Date of Patent: Sep. 3, 1991

[54] VIDEO CODEC INCLUDING PIPELINED PROCESSING ELEMENTS

[75] Inventors: Jong S. Lee; Oh W. Kwon; Joo H. Jeong; Ji H. Kim; Myoung H. Lee, Kyungki-Do, all of Rep. of Korea

[73] Assignees: Electronics and Telecommunications Research Institute, Daejeon; Korea Telecommunication Authority, Seoul, both of Rep. of Korea

[21] Appl. No.: 529,887

[22] Filed: May 29, 1990

[30] Foreign Application Priority Data

May 30, 1989 [KR] Rep. of Korea ............... 1989-7234

[51] Int. Cl.⁵ .............................................. H04N 1/42
[52] U.S. Cl. ....................................... 379/53; 358/85
[58] Field of Search .................... 379/53, 202, 100; 358/85; 370/62, 85.9, 85.11

[56] References Cited

FOREIGN PATENT DOCUMENTS 2219464A 6/1989 United Kingdom .................. 379/53

OTHER PUBLICATIONS

Telecommunications, vol. 23, No. 1, Jan. 89, p. 13.

Primary Examiner—Jin F. Ng
Assistant Examiner—Ahmad F. Matar
Attorney, Agent, or Firm—Blakely, Sokoloff, Taylor & Zafman

[57] ABSTRACT

A videophone system for providing videophone service within narrow band digital network, based on pipelined processing elements, includes source codec means coupled to the image bus, including numerous processing elements of which processing element has DSP (Digital Signal Processor) module, local memory module coupled to the DSP module, FIFO (First Input First Output) memory module coupled to the DSP module and the local memory module, and image bus interface module coupled to the DSP module and the local memory module and the image bus, wherein communications between the processor elements is performed via the pipeline and common memory means coupled to the VME bus and the image bus, for storing message data for synchronization and communication between the processing elements.

2 Claims, 6 Drawing Sheets

VIDEO CODEC INCLUDING PIPELINED PROCESSING ELEMENTS

BACKGROUND OF THE INVENTION

The present invention pertains to the field of videophone system applied to narrow band digital network, and more particularly relates to videophone system for enhancing its performance by using DSP (Digital Signal Processor) in image coder and decoder (hereinafter referred to as "codec").

The image compression code techniques in videophone service of narrow band digital natwork were required and could be performed by processing real-time image. The conventional hardware systems regarding this field are classified into the following two architectures. One is to implement image data compression algorithms by general integrated circuit. The other is to implement them by several DSP chips and digital processing software. The former has a disadvantage that the hardware design for forming the coding algorithms is very complicated. The latter has a disadvantage that the efficiency is lowered due to bus contention and dependence on DSP chip performance. An example of the latter system is hereinafter described with reference to FIG. 1. The videophone system of FIG. 1 was provided by AEG RESEARCH located in West Germany. In FIG. 1, reference number 10 shows CPU 68020, 11 VME (Versa Module Europe) bus, 12 1M Byte Frame memory, 13 ADSP (Analog Digital Signal Processor), 14 DRAM (Dynamic Random Access Memory), 15 memory bus, 16 video bus, 17 A/D converter, and 18 D/A converter, respectively.

ADSP's contain the DRAM(14), respectively. ADSP's 13 are coupled to each other and also to frame memory 12 via the memory bus 15. ADSP's 13 communicate with CPU 10 via VME bus 11. As seen above well, the above system's efficiency was lowered due to bus contention caused by all ADSP's 13 using the VME bus 11 and the memory bus 15.

SUMMARY OF THE INVENTION

It is an object of the present invention to provide an improved videophone system which can give efficient communication and synchronization between modules by using pipeline.

To achieve above object, the invention provides, in videophone system for providing videophone service within narrow band digital network, including transmission codec means for connecting to the narrow band digital network, VME bus and image bus coupled to the transmission codec means, camera, TV monitor, A/D (Analog to Digital) and D/A converter coupled to the camera and the TV monitor, and frame memory means coupled to the A/D and D/A converter and the image bus, a video phone system further comprising:

source codec means coupled to the image bus, including numerous processing elements of which processing element has DSP (Digital Signal Processor) module, local memory module coupled to the DSP module, FIFO (First Input First Output) memory module coupled to the DSP module and the local memory module, and image bus interface module coupled to the DSP module and the local memory module and the image bus, wherein communications between the processing elements are performed via the pipeline construction, and common memory means coupled to the VME bus and the image bus, for storing message data for synchronization and communication between the processing elements.

BRIEF DESCRIPTION OF THE DRAWINGS

The invention will be readily understood from the following more detailed description presented in conjunction with the following drawings, in which.

DESCRIPTION OF THE PREFERRED EMBODIMENTS

Figure 2:
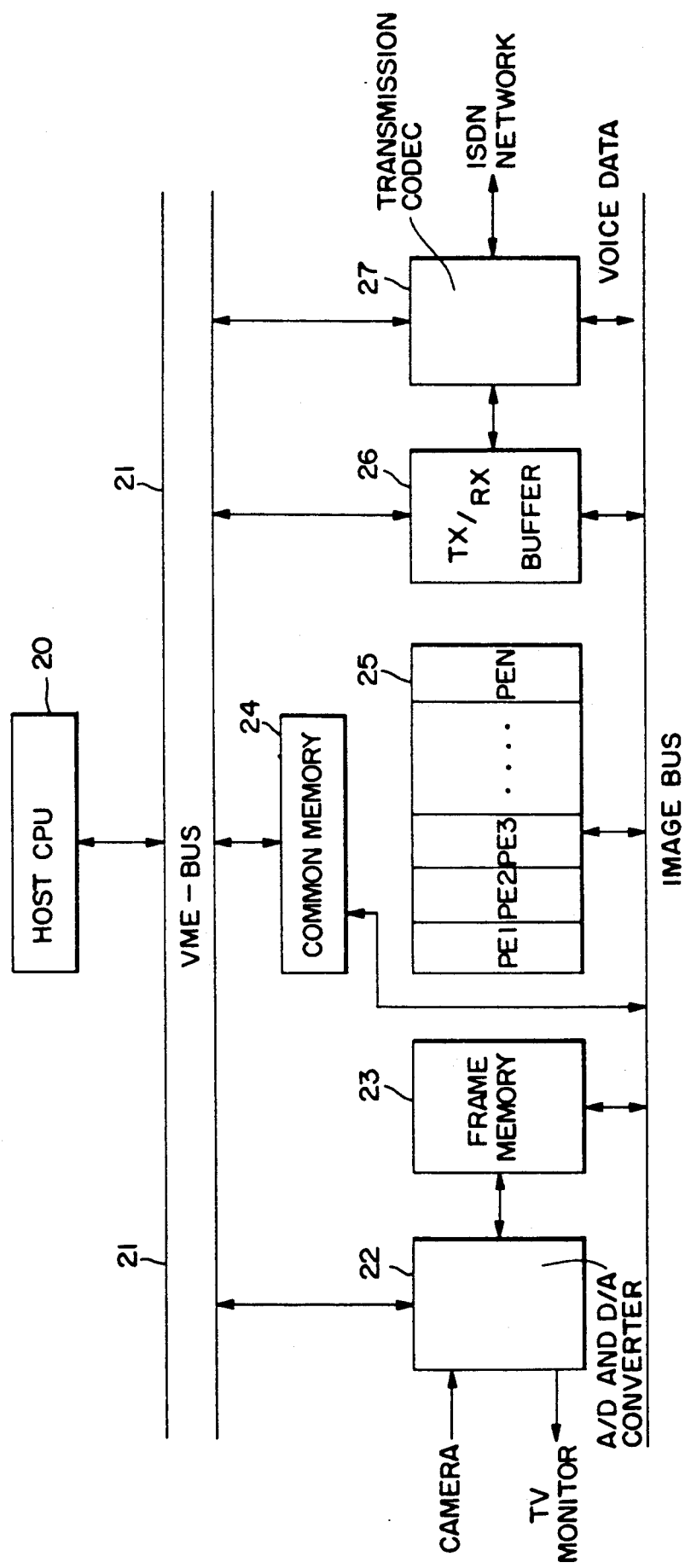
FIG. 2 is a block diagram of showing the architecture of the invention.

FIG. 2 is a block diagram of showing the architecture of the invention. In FIG. 2, 20 shows host CPU, 21 VME bus, 22 A/D and D/A converter, 23 frame memory, 24 common memory, 25 source codec, 26 TX/RX buffer, 27 transmission codec, and 28 image bus, respectively. The VME bus 21 functions as system bus for communication and synchronization between modules. The A/D and D/A converter 22 functions converting analog to digital and digital to analog.

The frame memory 23 coupled to the A/D and D/A converter 22 stores the converted image information. The common memory 24 is located between the VME bus 21 and the image bus 28, and functions as message storing part for communications between processing element(PE) of the source codec 25 and CPU 20, and between processing elements(PE). The common memory 24 performs efficient synchronization between processing elements and communications with other modules under the control of CPU 20.

The source codec 25 comprised of the numerous processing elements PE1 to PEN is coupled to the image bus 28, and performs compression of the image data using image compression algorithms. The TX/RX buffer 26 stores contemporarily the compressed image in formation transferred from the source codec 25 via the VME bus 21 or the image bus 28, and stores contemporarily the image data received from the transmission codec 27. The transmission codec constructs transmission frame format, corrects transmission errors using forward error correction(FEC), and interfaces with ISDN network.

The image bus 28 is used to transfer high speed image data. The processing element(PE) forming the source codec 25 contains a DSP performs a part of the functions of image coding, and obtains the input data from the frame memory 23 or the other processing element via pipeline.

The processing results are transferred into the next processing element via pipeline, or transferred into the other processing element via the common memory 24. The last compressed image data is sent to the transmission codec via the TX buffer 26. Then the processing elements perform image decoding function, process the input data from the RX buffer 26, and send the last decoded image to the frame memory 23.

Figure 3:
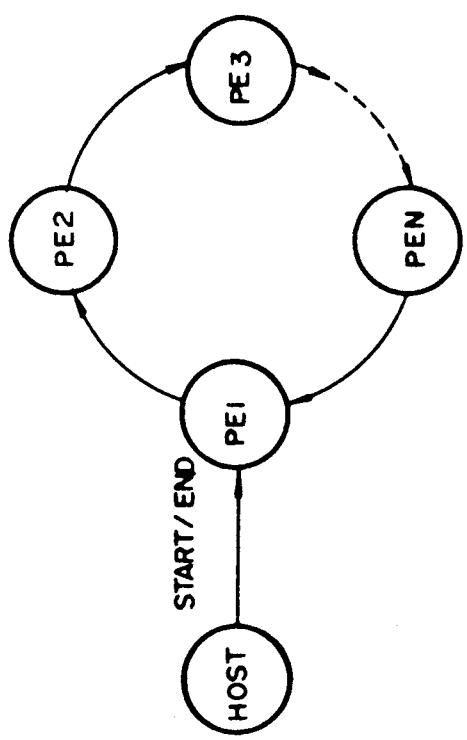
FIG. 3 is a diagram of showing synchronization and the method of accessing the image bus.

FIG. 3 is a diagram showing synchronization and the method of accessing the image bus 28. CPU 20 sends a starting message to the source codec 25 and sets a flag of the processing element PE1. After abtaining the necessary data via the image bus 28 and the common memory 24, the processing element PE1 resets its flag and sets a flag of the next processing element (for example, processing element PE2). And then the processing element PE1 performs its allocated job, and if it is ended, the processing element PE1 waits until its flag is set again. The processing element PE2 of which flag is set, sets a flag of the processing element PE3 in the same way as the processing element PE1.

If this process is advanced to the processing element PEN, the processing element PEN sets the flag of processing element PE1, and then the process is performed in the same manner. At this time, the movement of data for processing element is performed concurrently within a given time. That is, processing element moves both the input data and the processed data.

Figure 1:
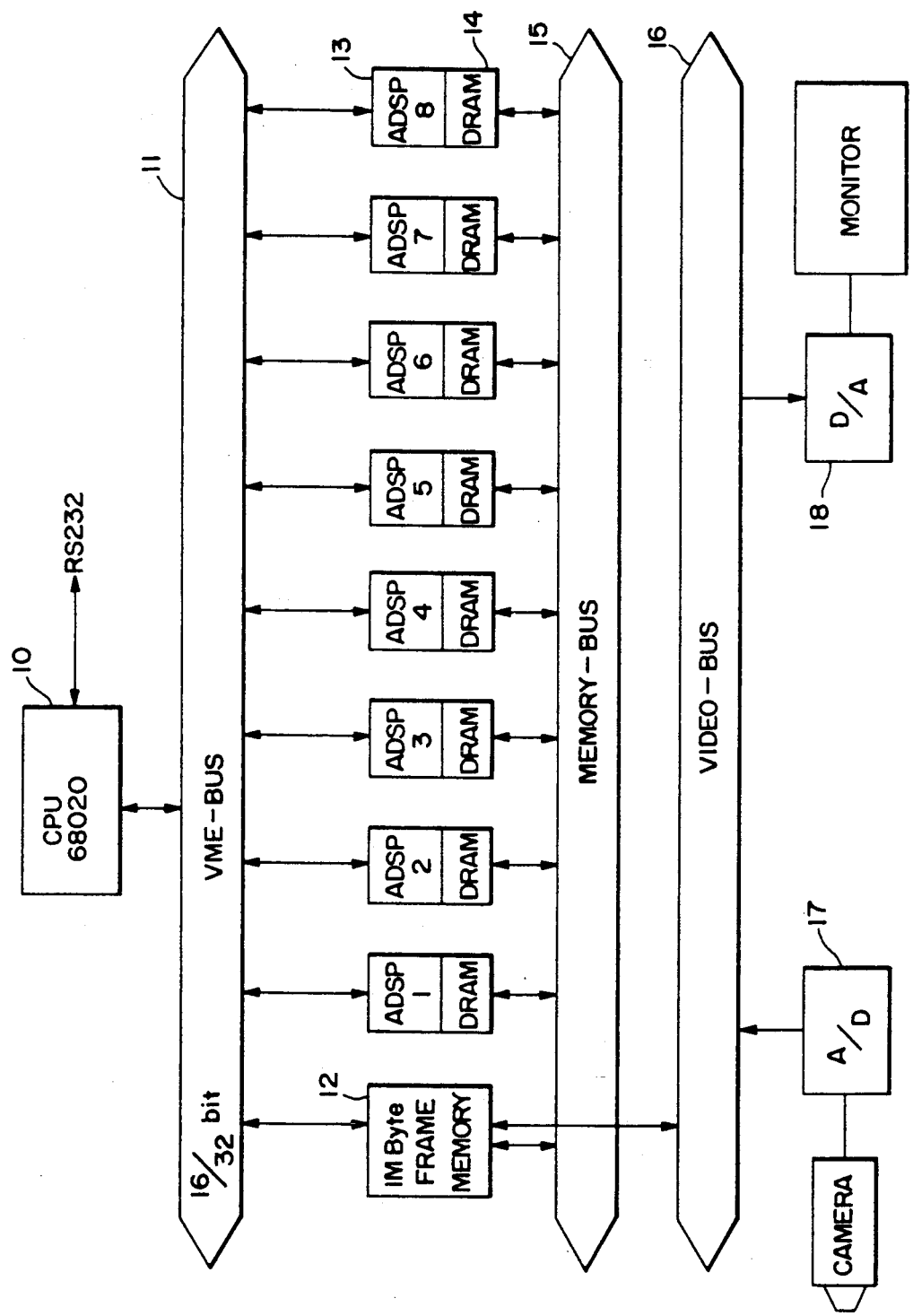
FIG. 1 is a diagram of showing the conventional architecture.

In FIG. 1, the VME bus 11 can be desirably comprised of Motorola's standard form of 24 bit address and 16 bit data lines, and the image bus 28 can be comprised of 16 bit address and 12 bit data lines, 4 lines for bus request and release, 10 control lines, and power supply line.

Figure 4:
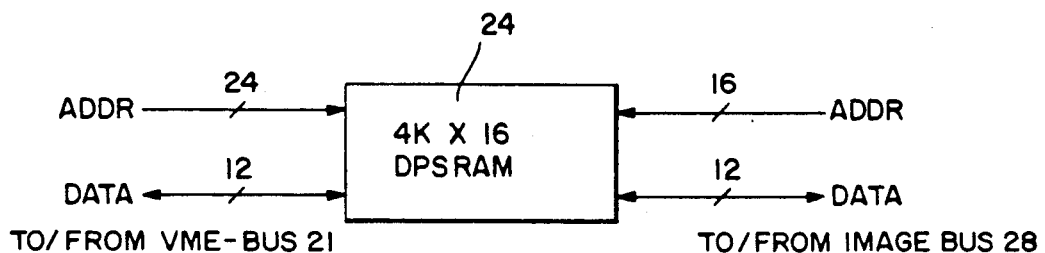
FIG. 4 is a hardware architecture diagram of common memory.

FIG. 4 is a hardware architecture diagram of the common memory 24. The common memory 24 is located at between the VME bus 21 and the image bus 28, and is comprised of 4K × 16 bit dual part SRAM (Static Random Access Memory)(DPSRAM) in this embodiment. The common memory 24 is connected to the VME bus 21 through 24 bit address and 12 bit data lines, and to the source codes 25 through 16 bit address and 12 bit data lines.

Figure 5:
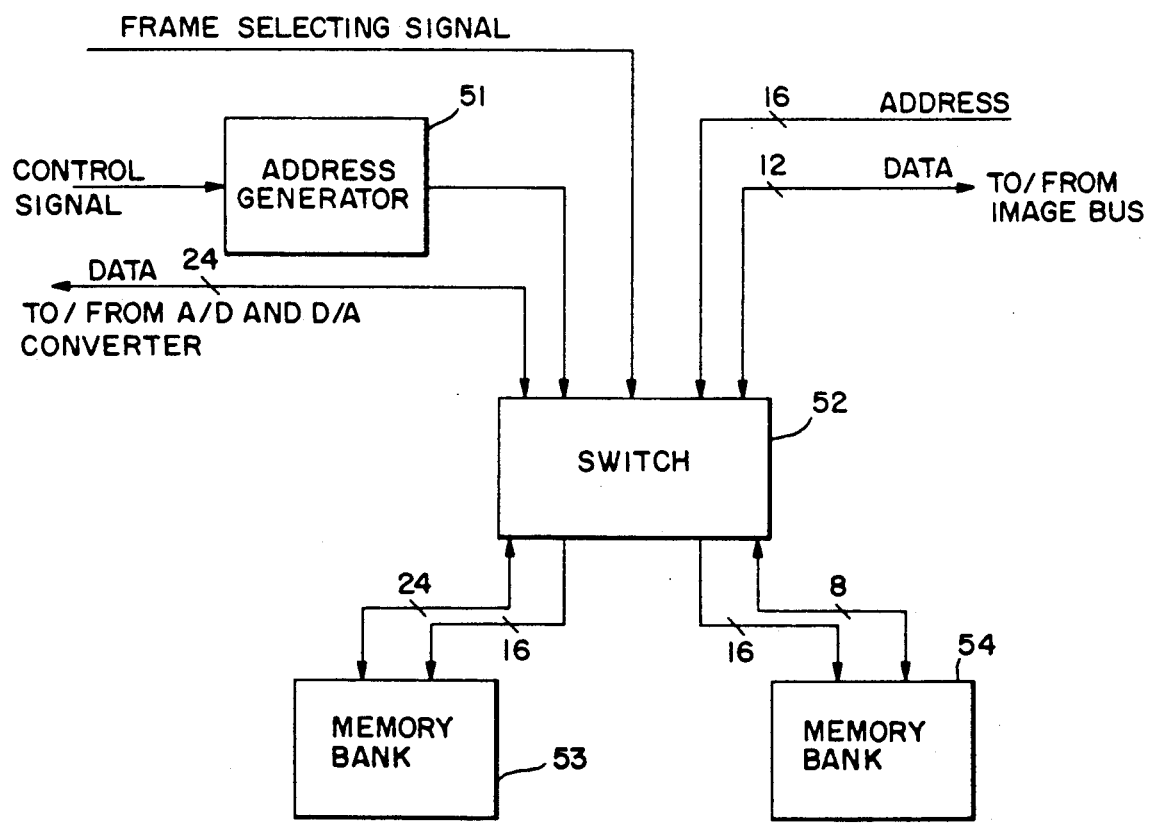
FIG. 5 is a hardware architecture diagram of frame memory.

FIG. 5 is a hardware architecture diagram of the frame memory 23. The frame memory 23 is connected to the A/D and D/A converter 22 and the image bus 28. The frame memory 23 is comprised of two 48 kbyte memory banks 53 and 54, switch 52, and address generator 51. The two memory banks 53 and 54 are connected to the A/D and D/A converter 22 and the image bus 28 according to selection of the switch 52, and the A/D and D/A converter and the source codec 25 can access independently a memory bank of the frame memory 23.

Figure 6:
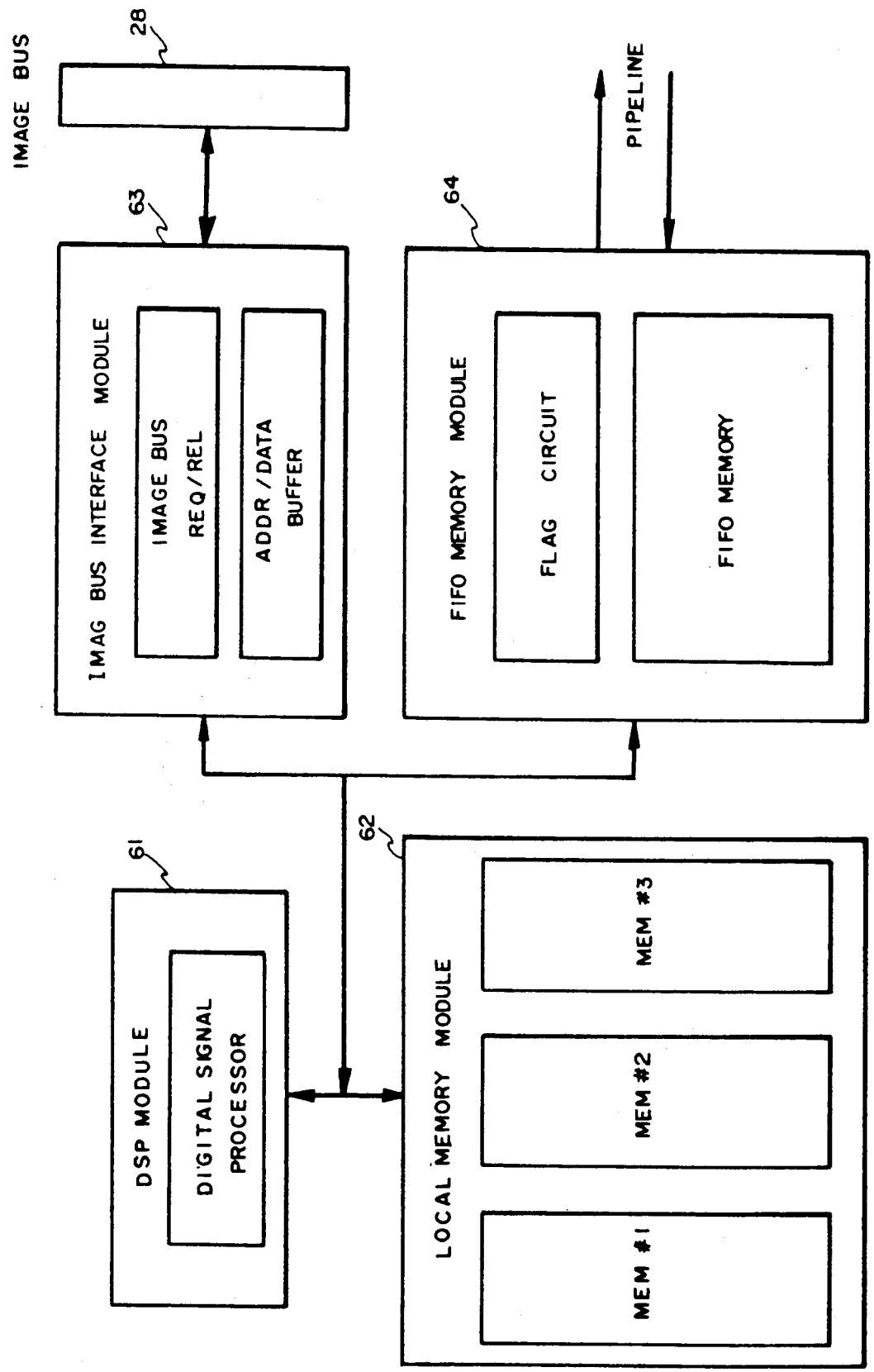
FIG. 6 is a hardware architecture diagram of processing element.

FIG. 6 is a hardware architecture diagram of the processing element within the source codec 25. DSP (Digital Signal Processor) module 61 performs video data compression algorithms and controls transfer of data and control signal through the image bus 28 and FIFO (First Input First Output) memory module 64. The local memory module 62 is comprised of memory #1, memory #2, and memory #3. One of the above memories stores a program of video data compression, and the other memories store the data necessary to perform the program. The image bus interface module 63 is comprised of image bus request/release and Addr-/Data buffer.

FIFO memory module 64 is comprised of flag circuit and FIFO memory. The flag circuit controls efficiently data flow between processing elements. FIFO memory is used to form pipeline between DSP modules.

Figure 7:
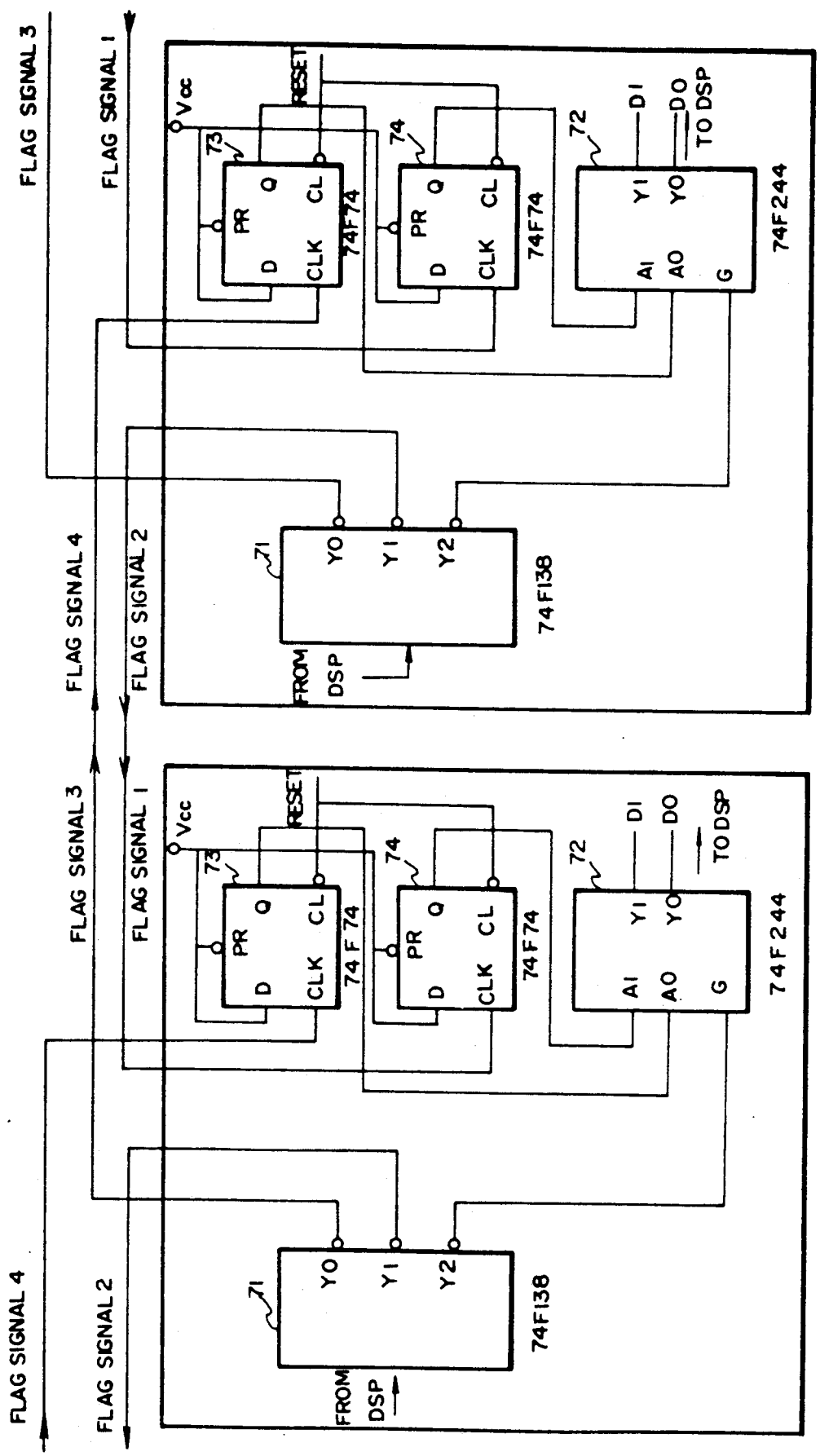
FIG. 7 is a circuit diagram of flag circuit.

FIG. 7 is a circuit diagram of flag circuit. The flag circuit is comprised of an address decoder 71 coupled to the DSP module 61, two D flip-flops 73,74 coupled to the other processing element, and a selection switch 72 coupled to the two D flip-flops 73,74 and the DSP module 61 and the address decoder 71 in order to select one of the two D flip-flop outputs and to send to the DSP module 61. In FIG. 7, flag signals 3 and 4 are that, after a DSP module(left) sends data to the next(right) module in pipeline, informs this fact to the next module. Flag signals 1 and 2 after a DSP module(right) reads all the data from its FIFO memory inform the prior(left) module of sending a new data.

What is claimed is:

1. In videophone system for providing videophone service within narrow band digital network, including transmission codec means for connecting to the narrow band digital network, VME (Versa Module Europe) bus and image bus coupled to the transmission codec means, camera, TV monitor, A/D (Analog to Digital) and D/A converter coupled to the camera and the TV monitor, and frame memory means coupled to the A/D and D/A converter and the image bus, a videophone system further comprising:

source codec means coupled to the image bus, including a plurality of processing elements of which processing element has DSP (Digital Signal Processor) module, local memory module coupled to the DSP module, FIFO (First Input First Output) memory module coupled to the DSP module and the local memory module, and image bus interface module coupled to the DSP module, the local memory module and the image bus, wherein communications between the processing elements are performed via pipeline, and common memory means coupled to the VME bus and the image bus, for storing message data for synchronization and communication between the processing elements.

2. A videophone system according to claim 1, the FIFO memory module including a flag circuit which is comprised of an address decoder coupled to the DSP module, first and second D flip-flops coupled to the other processing element, and a selection switch coupled to the first and second D flip-flops and the DSP module and the address decoder in order to select one of the two D flip-flop outputs and to send to the DSP module.

* * * * *